United States Patent
Lee et al.

(10) Patent No.: US 10,150,831 B2
(45) Date of Patent: Dec. 11, 2018

(54) ACRYLIC PROCESSING AID AND VINYL CHLORIDE RESIN COMPOSITION COMPRISING THE SAME

(71) Applicant: LG Chem, Ltd., Seoul (KR)

(72) Inventors: Kwang Jin Lee, Daejeon (KR); Geon Soo Kim, Daejeon (KR); Yoon Ho Kim, Daejeon (KR)

(73) Assignee: LG Chem, Ltd. (KR)

( * ) Notice: Subject to any disclaimer, the term of this patent is extended or adjusted under 35 U.S.C. 154(b) by 22 days.

(21) Appl. No.: 15/654,782

(22) Filed: Jul. 20, 2017

(65) Prior Publication Data
US 2018/0044460 A1 Feb. 15, 2018

(30) Foreign Application Priority Data
Aug. 9, 2016 (KR) .................. 10-2016-0101091

(51) Int. Cl.
*C08F 287/00* (2006.01)
*B01J 13/14* (2006.01)
*C08L 27/06* (2006.01)

(52) U.S. Cl.
CPC ............ *C08F 287/00* (2013.01); *B01J 13/14* (2013.01); *C08L 27/06* (2013.01); *C08L 2205/06* (2013.01); *C08L 2207/53* (2013.01)

(58) Field of Classification Search
CPC ...... C08F 287/00; C08F 30/08; C08F 130/08; C08F 230/08; C08F 283/12; C08L 2207/53
See application file for complete search history.

(56) References Cited

U.S. PATENT DOCUMENTS

| | | | |
|---|---|---|---|
| 5,523,365 A * | 6/1996 | Geck | C08F 293/00 524/804 |
| 5,741,845 A | 4/1998 | Frings et al. | |
| 6,074,628 A | 6/2000 | Bolich, Jr. et al. | |
| 2004/0171741 A1 | 9/2004 | Sato et al. | |
| 2012/0283381 A1* | 11/2012 | Tamiya | C08G 77/26 524/588 |

FOREIGN PATENT DOCUMENTS

| | | | |
|---|---|---|---|
| CN | 105504582 A | | 4/2016 |
| JP | H105262820 A | | 10/1993 |
| JP | H107018139 A | | 1/1995 |
| JP | 07216171 A | * | 8/1995 |
| JP | H07216171 A | | 8/1995 |
| JP | H08003254 A | | 1/1996 |
| JP | 2935964 B2 | | 8/1999 |
| JP | 2002114941 A | | 4/2002 |
| JP | 2003025511 A | | 1/2003 |
| JP | 2004359857 A | | 12/2004 |
| KR | 20010013109 A | | 2/2001 |
| KR | 20040020963 A | | 3/2004 |
| KR | 20040047510 A | | 6/2004 |
| KR | 20060127730 A | | 12/2006 |
| KR | 100752503 B1 | | 8/2007 |
| KR | 101189384 B1 | | 10/2012 |

OTHER PUBLICATIONS

Sahar Amiri, et al., "Silicone Macroinitiator in the Atom Transfer Radical Polymerization of Styrene and Vinyl Acetate: Synthesis and Characterization of Novel Thermoreversible Block Copolymers" ACS Symposium Series, vol. 1154, Chapter 7, pp. 87-101 Publication Date (Web): Dec. 10, 2013.

* cited by examiner

*Primary Examiner* — Mark S Kaucher
(74) *Attorney, Agent, or Firm* — Lerner, David, Littenberg, Krumholz & Mentlik, LLP

(57) ABSTRACT

The present disclosure relates to an acrylic processing aid and a vinyl chloride resin composition including the same, and in particular, to a core-shell-structured acrylic processing aid preparing a core using a silicone-azo macroinitiator and preparing a shell using C12 to C18 alkyl methacrylate as a co-monomer, and a vinyl chloride resin composition including the same.

The acrylic processing aid is used for sheet forming of the vinyl chloride resin, and facilitates manufacture of a high-quality vinyl chloride resin formed article having excellent transparency, adhesion resistance and heat stability, having no non-dispersed melt (fish-eye) production, and having significantly reduced air mark and flow mark occurrences.

13 Claims, No Drawings

ACRYLIC PROCESSING AID AND VINYL CHLORIDE RESIN COMPOSITION COMPRISING THE SAME

This application claims the benefit of Korean Application No. 10-2016-0101091 filed on Aug. 9, 2016, all of which are herein incorporated by reference in their entirety.

FIELD OF THE INVENTION

The present disclosure relates to an acrylic processing aid facilitating manufacture of a formed article having excellent transparency, adhesion resistance and surface state and a vinyl chloride resin composition including the same.

BACKGROUND OF THE INVENTION

A vinyl chloride resin is either a homopolymer of vinyl chloride or a copolymer including 50% or more of vinyl chloride. The vinyl chloride resin is widely used as a material of various products including wires, electromechanical products, toys, films, sheets, artificial leather, tarpauline, tapes, food packing materials and medical supplies using foaming, extrusion, injection, calendering and the like.

However, the vinyl chloride resin has a processing temperature closer to a pyrolysis temperature, and therefore, has disadvantages of having a narrow formable temperature range, having high melting viscosity and having low fluidity. In addition, the vinyl chloride resin tends to adhere to a metal surface of processing instruments during high temperature processing, which frequently produces carbides, and as a result, various problems relating to processing such as quality decline of final formed articles occur. In view of the above, a processing aid and a lubricant are used for enhancing processing characteristics of the vinyl chloride resin.

A processing aid and a lubricant are additives improving melting delay characteristics of the vinyl chloride resin itself and thereby helping the vinyl chloride resin sufficiently exhibit various mechanical and chemical properties, and have been mandatorily used in processing of the vinyl chloride resin.

Specifically, Korean Patent Application Laid-Open Publication No. 2006-127730 proposed a method of reducing adhesion with metals by adding a multilayer-structured polymer lubricant including high-priced silicone-based latex, however, the method caused a new problem of poor processing due to the silicon.

In addition, Korean Patent Application Laid-Open Publication No. 2004-0047510 disclosed a use of a core-shell-structured acrylic processing aid, however, the use was not able to sufficiently reduce adhesion with metals as well, and was not able to resolve a problem of quality decline of final formed articles.

Particularly, a surface defect problem such as air marks, flow marks and fish eyes having various shapes appearing on the surface seriously occurred as well as the above-mentioned problems during calender forming for sheet processing of the vinyl chloride resin.

A method of adding a processing aid and a lubricant in large quantities has been proposed in view of the above, however, a new problem of transparency decrease has been caused.

Accordingly, means to reduce adhesion with metals and resolve a surface defect problem while maintaining transparency has been required, and such demands are very urgent considering the amount of the vinyl chloride resin used throughout the industry.

PRIOR ART DOCUMENTS

Patent Documents

Korean Patent Application Laid-Open Publication No. 2006-127730 (2006 Dec. 13), Polymeric Lubricant Having Multilayer Structure and Manufacturing Method Thereof Korean Patent Application Laid-Open Publication No. 2004-0047510 (2004 Jun. 5), Copolymer Composition for Processing Aid

SUMMARY OF THE INVENTION

The inventors of the present disclosure have conducted studies from various angles and, as a result, have identified that, when preparing a core-shell-structured acrylic processing aid copolymerized in a specific composition and adding this in processing of a vinyl chloride resin, a surface defect problem such as air marks, flow marks and fish eyes may be resolved while maintaining transparency and while increasing adhesion resistance and heat stability.

In view of the above, the present disclosure is directed to providing an acrylic processing aid enhancing adhesion resistance and heat stability of a vinyl chloride resin and having no surface defect occurrences.

The present disclosure is also directed to providing a vinyl chloride resin composition including the acrylic processing aid.

One embodiment of the present disclosure provides an acrylic processing aid including a core including an acrylic-silicone block copolymer copolymerizing methyl methacrylate and a silicone-azo macroinitiator represented by the following Chemical Formula 1; and a shell copolymerizing methyl methacrylate and a C12 to C18 alkyl methacrylate monomer:

[Chemical Formula 1]

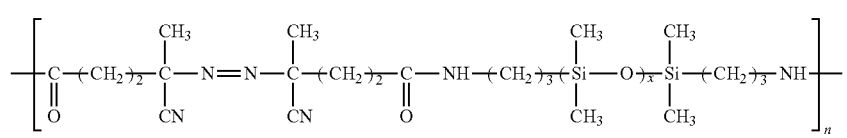

(In Chemical Formula 1, x is from 50 to 100, and n is from 1 to 10.)

Another embodiment of the present disclosure provides a vinyl chloride resin composition including the acrylic processing aid.

DETAILED DESCRIPTION OF THE EMBODIMENTS

Hereinafter, the present disclosure will be described in more detail.

Processing Aid

An acrylic processing aid capable of increasing adhesion resistance without inhibiting transparency in a forming process of a vinyl chloride resin, particularly, capable of suppressing surface quality defects (air marks, flow marks, fish eyes) after a calender forming process is provided.

The acrylic processing aid provided in the present disclosure has a core-shell structure, and herein, specific initiator and monomer are used as compositions of the core and the shell. Specifically, a silicone-azo macroinitiator is used when preparing the core to increase adhesion resistance and heat stability while maintaining transparency, and a C12 or higher methacrylate co-monomer is used when preparing the shell to suppress fish eyes formation, and particularly, by controlling specific viscosity ($\eta_{sp}$) of the core and the processing aid, a role as a processing aid may be performed together with suppressing air mark and flow mark occurrences.

Specifically, the core of the acrylic processing aid comprises an acrylic-silicone block copolymer prepared by copolymerizing methyl methacrylate and a silicone-azo macroinitiator for increasing adhesion resistance and heat stability.

Methyl methacrylate is a monomer that becomes a base composition of the acrylic processing aid and performs a main role as a processing aid. The methyl methacrylate is used in 50% by weight to 90% by weight and preferably in 65% by weight to 85% by weight with respect to a sum of 100% by weight of all the monomers forming the core. When the content is less than the above-mentioned range, the role as a processing aid, enhancing forming processability, may not be obtained, and when the content is greater than the above-mentioned range, the content of other monomers relatively decreases, and a target level of properties aimed in the present disclosure may not be obtained.

Particularly, the core of the acrylic processing aid according to the present disclosure performs a polymerization reaction using a silicone-azo macroinitiator represented by the following Chemical Formula 1, and herein, the initiator copolymerizes with the methyl methacrylate provided above to form an acrylic-silicone block copolymer.

resolves a surface defect problem such as flow marks and air marks produced in a formed article surface, and performs a role of increasing heat stability as well as reducing adhesion, due to a slip property of the silicon itself.

In order to stably obtain adhesion resistance and heat stability, a molecular weight and a content ratio of the silicone-azo macroinitiator are controlled.

Specifically, the silicone-azo macroinitiator of Chemical Formula 1 has a weight average molecular weight of 4,000 g/mol to 80,000 g/mol and preferably 8,000 g/mol to 50,000 g/mol. When the provided molecular weight is outside the above-mentioned range, functions as the acrylic processing aid may not be fulfilled causing a problem of declining processability and surface properties of a vinyl chloride resin through overall property decline, and therefore, the silicone-azo macroinitiator is properly selected and used so as to satisfy the above-mentioned range.

As for the content, the silicone-azo macroinitiator is used in 0.01% by weight to 20% by weight and preferably in 5% by weight to 15% by weight with respect to a sum of 100% by weight of all the monomers forming the core. When the content is less than the above-mentioned range, enhancement in the adhesion resistance and the heat stability of a vinyl chloride resin may not be expected, and when the content is greater than the above-mentioned range, transparency may decrease, and therefore, the silicone-azo macroinitiator is properly used in the above-mentioned range.

Additionally, the core may be copolymerized further including a C2 to C18 alkyl acrylate monomer.

The C2 to C18 alkyl acrylate monomer performs a role of increasing heat stability and transparency by increasing compatibility with a vinyl chloride resin due to the presence of a hydrophobic group. Specific examples thereof may comprise one or more types selected from the group consisting of ethyl acrylate, propyl acrylate, isopropyl acrylate, butyl acrylate, 2-ethylhexyl acrylate, octyl acrylate and stearyl acrylate, and butyl acrylate is used in the examples of the present disclosure.

The C2 to C8 alkyl acrylate monomer is used in 0% by weight to 30% by weight and preferably in 1% by weight to 15% by weight with respect to a sum of 100% by weight of all the monomers forming the core. When the content is greater than the above-mentioned range, compatibility with a vinyl chloride resin decreases and sufficient processability is not obtained causing concern of producing air marks

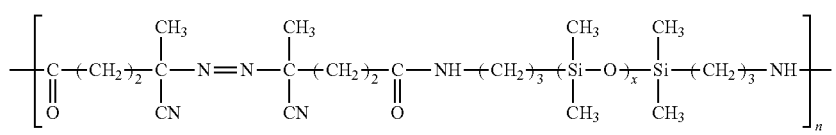

[Chemical Formula 1]

(In Chemical Formula 1, x is from 50 to 100, and n is from 1 to 10.)

In the silicone-azo macroinitiator of Chemical Formula 1, the azo group (—CN=NC—) is readily decomposed by heating or light irradiation and performs a role of a polymerization initiator generating radicals. The radicals of the azo group react with the vinyl group included in the methyl methacrylate to form the acrylic-silicone block copolymer repeatedly including a dimethylsilicon group (Si(CH$_3$)$_2$—O) and a dimethylsilane group (Si(CH$_3$)$_2$—CH$_2$) of Chemical Formula 1. Herein, by including a long molecular chain of a silicon group, the acrylic-silicone block copolymer and/or flow marks, and therefore, the C2 to C8 alkyl acrylate monomer is properly used in the above-mentioned range.

In addition, the shell of the acrylic processing aid according to the present disclosure is for providing a function as a processing aid, that is, providing excellent surface characteristics, and is prepared through copolymerizing methyl methacrylate and a C12 to C18 alkyl methacrylate monomer.

The methyl methacrylate is for accomplishing base properties as a processing aid, and is used in 50% by weight to 80% by weight and preferably in 60% by weight to 75% by weight with respect to a sum of 100% by weight of all the monomers forming the shell. When the content is less than the above-mentioned range, the role as a processing aid, enhancing forming processability, may not be obtained, and when the content is greater than the above-mentioned range, the content of other monomers relatively decreases, and a target level of properties aimed in the present disclosure may not be obtained.

Particularly, the acrylic processing aid of the present disclosure uses a C12 to C18 alkyl methacrylate monomer as a co-monomer of the methyl methacrylate.

The C12 to C18 alkyl methacrylate monomer may be one or more types selected from the group consisting of lauryl methacrylate, cetyl methacrylate, stearyl methacrylate, isostearyl methacrylate and tridecyl methacrylate, and preferably, cetyl methacrylate and/or stearyl methacrylate are used.

The content of such an alkyl methacrylate monomer affects adhesion, heat stability and surface characteristics of a vinyl chloride resin, and is from 20% by weight to 50% by weight and preferably from 25% by weight to 40% by weight with respect to a sum of 100% by weight of all the monomers forming the shell. When the content is less than the above-mentioned range, adhesion resistance and heat stability decrease, and flow marks, air marks and fish eyes are produced on a formed article surface, which declines surface qualities.

In addition, the shell further comprises an aromatic vinyl monomer.

The aromatic vinyl monomer may enhance transparency and increase heat stability of a vinyl chloride resin due to a high refractive index. Specific examples thereof may comprise one type selected from the group consisting of styrene, α-methylstyrene, o-ethylstyrene, p-ethylstyrene, vinyl toluene and combinations thereof. The aromatic vinyl monomer may be used in one, two or more types, and preferably, styrene is used.

The aromatic vinyl monomer is used in 0% by weight to 30% by weight and preferably in 1% by weight to 10% by weight with respect to a sum of 100% by weight of all the monomers forming the shell. When the content is greater than the above-mentioned range, viscosity of the acrylic processing aid is not readily controlled due to an increase in the molecular weight, and therefore, the content is properly controlled within the above-mentioned range.

Meanwhile, the core-shell-structured acrylic processing aid according to the present disclosure has the core and the processing aid have specific viscosity as well as limiting the composition.

Specific viscosity ($\eta_{sp}$) is one way of expressing polymer viscosity, and means a value obtained by dividing a value subtracting a pure solvent flow time ($t_0$) from a polymer solution flow time (t) by the pure solvent flow time ($t_0$) for measuring polymer viscosity in a solution state.

$$\frac{t - t_0}{t_0} = \eta_{sp} \quad \text{[Mathematical Formula 1]}$$

(In Mathematical Formula 1, t is a polymer solution flow time, and to is a pure solvent flow time.)

Herein, having high specific viscosity is lengthening a flow time and means having a high polymer molecular weight, and having low specific viscosity is shortening a flow time and means having a low polymer molecular weight.

In the present disclosure, the core is prepared to have a specific viscosity range of 0.3 to 2.0 and preferably 0.5 to 1.8, and the final processing aid having the shell formed therein as well is prepared to have a specific viscosity range of 0.3 to 2.0 and preferably 0.5 to 1.8. When specific viscosity of the core and the processing aid is less than the above-mentioned range, processability declines producing air marks on a formed article surface, and when the specific viscosity is greater than the above-mentioned range, flow marks are produced on a formed article. In other words, when the specific viscosity is outside the above-mentioned range, a problem such as surface property defects occurs in a finally manufactured formed article, and therefore, the specific viscosity is controlled to be in the above-mentioned range.

Moreover, the core-shell-structured acrylic processing aid according to the present disclosure comprises the core in 50% by weight to 80% by weight and the shell in 20% by weight to 50% by weight with respect to 100% by weight of all the monomers of the core and the shell. Such a range may secure the effects described above required for each of the core and the shell, that is, the effects of enhancing adhesion resistance and heat stability without decreasing transparency, and not producing air marks, flow marks and fish eyes.

Method for Preparing Processing Aid

The preparation of the monomer-copolymerized processing aid described above is not particularly limited, and may be prepared through 2-step polymerization.

Specifically, the core-shell-structured acrylic processing aid is prepared including preparing a core by copolymerizing, as monomers, methyl methacrylate, a C2 to C18 alkyl acrylate monomer and a silicone-azo macroinitiator; and preparing a shell by mixing methyl methacrylate, a C12 to C18 alkyl methacrylate monomer and an aromatic vinyl monomer to the core and polymerizing the result.

Hereinafter, each step will be described.

First, a core is prepared by copolymerizing, as monomers, methyl methacrylate, a C2 to C18 alkyl acrylate monomer and a silicone-azo macroinitiator.

Herein, the copolymerization may be carried out using various methods such as emulsion polymerization, mass-polymerization, suspension polymerization and solution polymerization, and preferably, emulsion polymerization is used.

Various compositions and reaction conditions of the initiator required for the emulsion polymerization are not particularly limited in the present disclosure, and follow those known in the art.

As the initiator, a water-soluble initiator may be used, and examples thereof may comprise inorganic peroxides such as sodium persulfate, potassium persulfate, ammonium persulfate, potassium superphosphate and hydrogen peroxide; organic peroxides such as t-butyl peroxide, cumene hydroperoxide, p-menthane hydroperoxide, di-t-butyl peroxide, t-butylcumyl peroxide, acetyl peroxide, isobutyl peroxide, octanoyl peroxide, dibenzoyl peroxide, 3,5,5-trimethylhexanol peroxide and t-butyl peroxyisobutyrate; nitrogen compounds such as azobisisobutyronitrile, azobis-2,4-dimethylvaleronitrile, azobiscyclohexanecarbonitrile and azobisiso (butyric acid)methyl, and the like. These initiators are used in 0.03 parts by weight to 0.2 parts by weight with respect to 100 parts by weight of all the monomers.

The polymerization may be carried out for 2 hours to 12 hours at 40° C. to 80° C.

According to one embodiment of the present disclosure, additives commonly known in the art such as a redox catalyst, a polymerization initiator, an emulsifier (or surfactant), a molecular weight modifier, an activator and deionized water may be further comprised in the emulsion polymerization.

As the emulsifier, one or more types may be selected from the group consisting of anionic emulsifiers, cationic emulsifiers and non-ionic emulsifiers, and the emulsifier is not particularly limited in the present disclosure. As one example of the emulsifier, one or more types may be selected from the group consisting of anionic emulsifiers generally widely used in emulsion polymerization such as sulfonate-based, carboxylate-based, succinate-based, sulfosuccinate and metal salts thereof, for example, alkylbenzene sulfonate, sodium alkylbenzene sulfonate, alkyl sulfonate, sodium alkyl sulfonate, sodium polyoxyethylene nonyl phenyl ether sulfonate, sodium stearate, sodium dodecyl sulfate, sodium lauryl sulfate, sodium dodecyl sulfosuccinate and abietate; cationic emulsifiers in which amine halides, alkyl quaternary ammoniums, alkyl pyridinium salts and the like bond as a functional group of higher aliphatic hydrocarbon; and non-ionic emulsifiers such as polyvinyl alcohol and polyoxyethylene nonyl phenyl, however, the emulsifier is not limited to these emulsifiers. Such an emulsifier may be used in 0.1 parts by weight to 5 parts by weight with respect to 100 parts by weight of the monomer mixture.

The molecular weight modifier is not particularly limited, and examples thereof may comprise mercaptans such as an a-methylstyrene dimer, t-dodecyl mercaptan, n-dodecyl mercaptan and octyl mercaptan; halogenated hydrocarbon such as carbon tetrachloride, methylene chloride and methylene bromide; sulfur-containing compounds such as tetraethyldiuram disulfide, dipentamethylene diuram disulfide and diisopropyl xanthogen disulfide, and the molecular weight modifier may be used in 0.1 parts by weight to 3 parts by weight with respect to 100 parts by weight of the monomer mixture.

As the activator, one or more selected from among, although not limited thereto, sodium hydrosulfite, sodium formaldehyde sulfoxylate, sodium ethylenediaminetetraacetate, ferrous sulfate, lactose, dextrose, sodium linoleate and sodium sulfate may be each introduced in a range of 0.01 parts by weight to 0.15 parts by weight based on a sum of 100 parts by weight of the monomers in each step.

The redox catalyst is not particularly limited, and examples thereof may comprise sodium formaldehyde sulfoxylate, ferrous sulfate, disodium ethylenediaminetetraacetate, copper sulfate and the like, and the redox catalyst may be used in 0.01 parts by weight to 0.1 parts by weight with respect to 100 parts by weight of the monomer mixture.

In the present disclosure, the monomer mixture may be introduced at once and polymerized, or the monomer mixture may be introduced in installments and polymerized step by step. When the monomer mixture is introduced in installments and polymerized step by step, 60% by weight to 90% by weight of the whole monomer mixture is introduced in the first step, and 10% by weight to 40% by weight thereof is introduced in the second step. The reason for such 2-step polymerization is that processing aid characteristics, surface characteristics and the like may be improved, and best properties are exhibited. In addition, an effect of significantly reducing a non-melting phenomenon may be obtained since solid melting is smooth.

Next, a core-shell-structured acrylic processing aid is prepared including preparing a shell by mixing methyl methacrylate, a C12 to C18 alkyl methacrylate monomer and an aromatic vinyl monomer to the core and polymerizing the result.

Herein, the emulsion polymerization for preparing a shell is carried out in the same manner as described above.

After preparing the core-shell, a processing aid in a powder state may be obtained after going through flocculation.

The flocculation is carried out through adding a flocculant, and herein, the flocculant may comprise metal halides such as barium chloride, calcium chloride, magnesium chloride, zinc chloride and aluminum chloride; nitrates such as barium nitrate, calcium nitrate and zinc nitrate; acetates such as barium acetate, calcium acetate and zinc acetate; sulfates such as calcium sulfate, magnesium sulfate and aluminum sulfate. Among these, calcium chloride and magnesium sulfate are preferred. The flocculation is carried out at 50° C. to 100° C., and 5% by weight or less of the flocculant based on the total amount of all the salts used in the flocculation may remain when flocculated.

Subsequently, a processing aid in a powder state may be obtained by dewatering and drying using common methods after the flocculation.

Herein, washing may be carried out at 50° C. to 90° C. through the use of distilled water and the like, and the acrylic processing aid prepared after going through such steps has a weight average molecular weight (MW) of 2,000,000 g/mol to 5,000,000 g/mol to smoothly perform a function as a processing aid.

Vinyl Chloride Resin Composition

The acrylic processing aid according to the present disclosure is obtained in a powder state and may be used in forming process of a vinyl chloride resin.

Such an acrylic processing aid is used as a processing aid when forming a vinyl chloride resin, and by increasing adhesion resistance and heat stability of the vinyl chloride resin for metals without decreasing transparency, resolves a problem of carbonization that used to occur due to adhesion to a metal mold. Moreover, surface defects such as air marks, flow marks and fish eyes having various shapes appearing on the surface either do not occur or are suppressed to the maximum as well as resolving the above-mentioned problems during calender forming for sheet processing of the vinyl chloride resin.

Specifically, the acrylic processing aid according to the present disclosure is added in 0.1 parts by weight to 10 parts by weight and preferably in 0.5 parts by weight to 7 parts by weight with respect to 100 parts by weight of the vinyl chloride resin to be used in the manufacture of various vinyl chloride resin formed articles. When the content of the acrylic processing aid is less than the above-mentioned range, processability, formability and heat stability obtained from the use of the processing aid are low declining qualities of manufactured formed articles, and when the content is greater than the above-mentioned range, processability declines, and various mechanical and chemical properties decline as well, and therefore, the acrylic processing aid is properly used in the above-mentioned range.

Herein, various additives commonly used in the art may be further included. As the additives, common additives such as a heat stabilizer, a lubricant, an impact modifier, a plasticizer, a UV stabilizer, a flame retardant, a colorant, a filler, an antimicrobial, a releasing agent, an anti-oxidant, a photostabilizer, a compatibilizer, a dye, an inorganic additive, a surfactant, a nucleating agent, a coupling agent, an admixture, a stabilizer, an antistatic agent, a pigment and a resisting agent, and these may be used either alone or as a mixture of two or more types.

Calender forming using the vinyl chloride resin composition is not particularly limited in the present disclosure, and follows known methods.

Hereinafter, preferred examples are provided for illuminating the present disclosure, however, the following examples are for illustrative purposes only, and it is obvious to those skilled in the art that various modifications and changes may be made within the scope and technological ideas of the present disclosure, and such modifications and changes also belong to the scope of the attached claims.

Example 1: Preparation of Acrylic Processing Aid and Vinyl Chloride Resin (Step 1: Preparation of Acrylic-Silicone Block Copolymer Core)

First, a 4-neck flask reactor equipped with a stirrer, a thermostat, a nitrogen entrance and a circulating condenser was prepared, 80 parts by weight of deionized water (DDI water), 0.001 parts by weight of ferrous sulfate and 0.02 parts by weight of disodium ethylenediaminetetraacetate were introduced thereto, and the temperature inside the reactor was maintained at 70° C. under nitrogen atmosphere.

As for preparing monomer pre-emulsion, 50 parts by weight of deionized water, 0.40 parts by weight of an emulsifier (sodium dodecylbenzene sulfonate; SDBS), 65 parts by weight of methyl methacrylate (MMA), 5 parts by weight of a silicone-azo macroinitiator (Mw 10000; SAM) and 0.02 parts by weight of a molecular weight modifier (tert-dodecyl mercaptan; TDDM) were introduced to prepare monomer pre-emulsion.

When the temperature inside the reactor reached 70° C., 0.10 parts by weight of potassium peroxide (KPS) and 0.10 parts by weight of sodium formaldehyde sulfoxylate (SFS) were introduced at the same time as an initiator over 3 hours together with the monomer pre-emulsion to progress a reaction.

After 30 minutes from the completion of the monomer pre-emulsion introduction, 0.01 parts by weight of KPS and 0.01 parts by weight of SFS were additionally introduced, and the result was matured for 1 hour.

(Step 2: Preparation of Processing Aid Cell)

For cell polymerization, the reactor temperature was maintained at 70° C. Before a reaction, monomer pre-emulsion was prepared in advance by introducing 30 parts by weight of ion exchange water, 20 parts by weight of DBSO, 15 parts by weight of MMA, 10 parts by weight of stearyl methacrylate (SMA), 5 parts by weight of styrene (SM) and 0.01 parts by weight of a molecular weight modifier (tert-dodecyl mercaptan; TDDM).

The prepared monomer pre-emulsion and, as an initiator, 0.05 parts by weight of KPS and 0.05 parts by weight of SFS were introduced to a reactor for 1 hour to progress a reaction.

After 30 minutes from the completion of the monomer pre-emulsion introduction, 0.01 parts by weight of KPS and 0.01 parts by weight of SFS were additionally introduced, and the result was matured for 1 hour. The total solid content (TSC) of the prepared latex was approximately 38% and the latex particle diameter was measured as 130 nm.

For the solid in the polymer latex, 4 parts by weight of a calcium chloride solution (10% by weight) was introduced at once to flocculate and obtain slurry, and then the slurry was washed 2 to 3 times with ion exchange water to wash away byproducts, and after a large quantity of the washing water was removed through filtration, the result was dried for 3 hours at 70° C. using a small fluidized-bed dryer used for laboratory use to obtain acrylic processing aid powder.

(Step 3: Preparation of Vinyl Chloride Resin)

100 parts by weight of a vinyl chloride resin (LS080, LG Chem. Ltd.) having a degree of polymerization of 800, 1.5 parts by weight of OT700R (manufactured by Songwon Industrial Co., Ltd.) as a complex stabilizer, 0.8 parts by weight of G-16 (Loxiol) as an internal activator, 0.5 parts by weight of G70S (Loxiol) as an external activator, and 0.3 parts by weight of BMP25 (manufactured by Pungkyung Fine Chemical Co., Ltd.) as a colorant were mixed in a Henschel mixer up to 100° C., and 2 parts by weight of the processing aid prepared above was added thereto to prepare a vinyl chloride resin.

Example 2: Preparation of Acrylic Processing Aid and Vinyl Chloride Resin

An acrylic processing aid and a vinyl chloride resin were prepared in the same manner as in Example 1 except that 8 parts by weight of a silicone-azo macroinitiator was used in the Step 1 core preparation, and 20 parts by weight of MMA and 10 parts by weight of cetyl methacrylate were used in the Step 2 preparation.

Example 3: Preparation of Acrylic Processing Aid and Vinyl Chloride Resin

An acrylic processing aid and a vinyl chloride resin were prepared in the same manner as in Example 1 except that the polymerization temperature was 75° C. in the Step 1 and Step 2 preparations.

Example 4: Preparation of Acrylic Processing Aid and Vinyl Chloride Resin

An acrylic processing aid and a vinyl chloride resin were prepared in the same manner as in Example 1 except that the core was prepared using 60 parts by weight of MMA, 5 parts by weight of BA and 5 parts by weight of a silicone-azo macroinitiator in the Step 1 core preparation.

Example 5: Preparation of Acrylic Processing Aid and Vinyl Chloride Resin

An acrylic processing aid and a vinyl chloride resin were prepared in the same manner as in Example 1 except that the polymerization was carried out at 63° C. in the Step 1 and Step 2 preparations.

Comparative Example 1: Preparation of Acrylic Processing Aid and Vinyl Chloride Resin An acrylic processing aid and a vinyl chloride resin were prepared in the same manner as in Example 1 except that a silicone-azo macroinitiator was not used in the Step 1 core preparation.

Comparative Example 2: Preparation of Acrylic Processing Aid and Vinyl Chloride Resin An acrylic processing aid and a vinyl chloride resin were prepared in the same manner as in Example 1 except that 50 parts by weight of MMA and 20 parts by weight of a silicone-azo macroinitiator were used in the Step 1 core preparation.

Comparative Example 3: Preparation of Acrylic Processing Aid and Vinyl Chloride Resin An acrylic processing aid and a vinyl chloride resin were prepared in the same manner as in Example 1 except that 0.15 parts by weight of TDDM was used, and the polymerization was carried out at 85° C. in the Step 1 core preparation.

Comparative Example 4: Preparation of Acrylic Processing Aid and Vinyl Chloride Resin An acrylic processing aid and a vinyl chloride resin were prepared in the same manner as in Example 1 except that the TDDM was not used, and the polymerization was carried out at 55° C. in the Step 1 core preparation.

Comparative Example 5: Preparation of Acrylic Processing Aid and Vinyl Chloride Resin An acrylic processing aid and a vinyl chloride resin were prepared in the same manner as in Example 1 except that 25 parts by weight of MMA and 5 parts by weight SM were used in the Step 2 shell preparation.

Test Example 1: Measurements on Properties of Acrylic Processing Aid and Vinyl Chloride Resin Properties of the acrylic processing aids and the vinyl chloride resins prepared in the examples and the comparative examples were measured as follows, and the obtained results are shown in Table 1.

(1) Specific Viscosity ($\eta sp$) Measurement 0.5 g of the acrylic processing aid was dissolved in 10 ml of a tetrahydrofuran (THF) solvent, and specific viscosity was measured based on the following Mathematical Formula 1 using a Ubbelohde viscometer.

Specific viscosity=(time solution−time THF)/time THF  [Mathematical Formula 1]

(2) Adhesion Resistance Evaluation

For adhesion evaluation, 100 parts by weight of polyvinyl chloride (degree of polymerization=800, LS080 manufactured by LG Chem. Ltd.), 3.0 g of a tin-based stabilizer, 0.9 g calcium stearate (Ca-St) were introduced to a Henshel Mixer at room temperature, and then the result was mixed at 1,000 rpm while raising the temperature up to 115° C., and then cooled to 40° C. to complete a master batch. 3 g of the sample was added thereto, and after mixing the result again at room temperature, 100 g of the powder mixture was milled for 4 minutes under the condition of roll mixing temperature of 200° C., roll revolution count of 14×15 rpm and roll spacing of 0.3 mm using a 6 inch 2-roll mill, and adhesion on the roll surface was evaluated.

A 5-point method was used for the evaluation, and evaluation was performed based on the following criteria.

<Evaluation Criteria>
5: Not Stretched at all while being stripped.
4: Hardly Stretched while being stripped.
3: Stretched a little while being stripped.
2: Stripped but stretched much.
1: Not stripped.

(3) Heat Stability Evaluation

To the master batch prepared above, samples to measure were added in 20 parts by weight each, and after mixing the result again at room temperature, 100 parts by weight of the powder mixture was milled for 10 minutes under the condition of roll mixing temperature of 200° C., roll revolution count of 14×15 rpm and roll spacing of 0.3 mm using a 6 inch 2-roll mill, and heat stability for the sheet samples was evaluated.

ΔYI=YI(sheet sample processed for 10 minutes)−YI (sheet sample processed for 3 minutes)  [Mathematical Formula 2]

ΔYI: yellowness index (YI) was measured in accordance with the ASTM E313-1996 rule using a spectrophotometer (CM-3600d, KONICA-MINOLTA, INC.). ΔYI means a change in the YI value after 1000 hours compared to the beginning.

(4) Transparency

To the master batch prepared above, samples to measure were added in 2 parts by weight each, and after mixing the result again at room temperature, 100 parts by weight of the powder mixture was milled for 5 minutes under the condition of roll mixing temperature of 195° C., roll revolution count of 14×15 rpm and roll spacing of 0.3 mm using a 6 inch 2-roll mill, and transparency and haze were measured for each of the sheet samples.

(5) Air Mark Evaluation

To the master batch prepared above, samples to measure were added in 2 parts by weight each, and after mixing the result again at room temperature, 100 parts by weight of the powder mixture was milled for 3 minutes under the condition of roll mixing temperature of 185° C., roll revolution count of 14×15 rpm and roll spacing of 0.3 mm using a 6 inch 2-roll mill, and the sheet samples were evaluated based on the following criteria.

<Evaluation Criteria>
5: There were no air marks at all.
4: A small number of air marks were observed.
3: Air marks were observed but not enough to become a problem.
2: Air marks were observed and it becomes a problem in the actual use.
1: Air marks were very much produced and it is not able to be actually used.

(6) Flow Mark Evaluation

To the master batch prepared above, samples to measure were added in 2 parts by weight each, and after mixing the result again at room temperature, 100 parts by weight of the powder mixture was milled for 3 minutes under the condition of roll mixing temperature of 200° C., roll revolution count of 14×15 rpm and roll spacing of 0.3 mm using a 6 inch 2-roll mill, and the sheet samples were evaluated based on the following criteria.

<Evaluation Criteria>
5: There were no flow marks at all.
4: A small number of flow marks were observed.
3: Flow marks were observed but not enough to become a problem.
2: Flow marks were observed and it becomes a problem in the actual use.
1: Flow marks were very much produced and it is not able to be actually used.

(7) Fish Eye (Non-Dispersed Melt Projection) Measurement

After preparing a vinyl chloride resin composition without adding a filler, the composition was extruded to a film having a thickness of 0.2 mm using a T-die-equipped 20 mm single screw extruder at a cylinder temperature of 180° C. and a screw rate of 30 rpm, and the number of fish eyes present in the fixed region on the film surface was observed with the eye. The evaluation was performed based on the following criteria.

<Evaluation Criteria>
5 points: When there are almost no fish eyes
3 points: When fish eyes are produced a little
1 point: When fish eyes are much produced

TABLE 1

| | | Example | | | | | Comparative Example | | | | |
|---|---|---|---|---|---|---|---|---|---|---|---|
| | | 1 | 2 | 3 | 4 | 5 | 1 | 2 | 3 | 4 | 5 |
| Core | MMA | 65 | 62 | 65 | 60 | 65 | 70 | 50 | 65 | 65 | 65 |
| | BA | | | | 5 | | | | | | |
| | SAM | 5 | 8 | 5 | 5 | 5 | | 20 | 5 | 5 | 5 |
| Shell | MMA | 15 | 20 | 15 | 15 | 15 | 15 | 15 | 15 | 15 | 25 |
| | CMA | | 10 | | | | | | | | |
| | SMA | 10 | | 10 | 10 | 10 | 10 | 10 | 10 | 10 | |
| | SM | 5 | | 5 | 5 | 5 | 5 | 5 | 5 | 5 | 5 |
| Specific Viscosity [0.3 to 2.0] | Core | 1.1 | 0.8 | 0.7 | 1.2 | 1.7 | 1.2 | 1.3 | 0.1 | 2.5 | 1.0 |
| | Acrylic Processing Aid | 1.5 | 1.4 | 1.2 | 1.4 | 1.8 | 1.6 | 1.5 | 0.7 | 1.4 | 1.6 |
| Adhesion Resistance [4 to 5] | | 5 | 5 | 4 | 5 | 5 | 1 | 4 | 3 | 3 | 3 |
| Heat Stability, ΔYI [10 to 30] | | 15 | 13 | 17 | 18 | 14 | 45 | 25 | 35 | 36 | 40 |
| Transparency % [83 to 88] | | 86 | 85 | 87 | 85 | 87 | 86 | 80 | 86 | 85 | 85 |
| %, [4 to 8] | | 5.9 | 6.1 | 5.7 | 5.8 | 5.9 | 5.4 | 8.9 | 5.5 | 5.6 | 5.8 |
| Air Marks [4 to 5] | | 5 | 5 | 4 | 4 | 5 | 3 | 2 | 1 | 3 | 3 |
| Flow Marks [4 to 5] | | 5 | 5 | 5 | 5 | 5 | 3 | 3 | 3 | 1 | 3 |
| Fish Eyes [4 to 5] | | 5 | 4 | 5 | 5 | 5 | 3 | 3 | 2 | 3 | 1 |

According to Table 1, it was seen that the compositions of Examples 1 to 5 using the silicone-azo macroinitiator by the present disclosure had excellent adhesion resistance and heat stability while maintaining transparency of 85%, and surface defects such as air marks, flow marks and fish eyes hardly occurred.

In comparison, it was seen that heat stability and adhesion resistance were low to a serious level when the silicone-azo macroinitiator was not used as in Comparative Example 1. In addition, surface defects such as air marks, flow marks and fish eyes seriously occurred.

When using the silicone-azo macroinitiator in excess as in Comparative Example 2, heat stability and adhesion resistance were somewhat enhanced, however, there was a problem of transparency decrease.

In Comparative Examples 3 and 4 having the specific viscosity of the core and the processing aid outside the range of 0.3 to 2.0 while maintaining the silicone-azo macroinitiator content, transparency was favorable, however, the values were low in terms of adhesion resistance and heat stability producing various surface defects.

In addition, in the composition that did not use C12 to C18 methacrylate in the shell as in Comparative Example 5, there was a problem of serious fish eye degradation.

Through such results, it was seen that, when specific viscosity is controlled while using a silicone-azo macroinitiator in a core as an acrylic processing aid and using C12 to C18 methacrylate in a shell when processing a vinyl chloride resin, transparency was maintained while securing adhesion resistance and heat stability of the vinyl chloride resin to an excellent level, and surface defects were suppressed.

The acrylic processing aid according to the present disclosure is used in a forming process of a vinyl chloride resin, and increases adhesion resistance and heat stability without decreasing transparency and thereby improves forming qualities by improving an adhesion property for metals.

In addition, processing of high-quality formed article can be obtained by suppressing the occurrences of air marks, flow marks and fish eyes that used to occur during existing calender forming processes of a vinyl chloride resin.

The acrylic processing aid of the present disclosure is used as a processing aid when manufacturing various formed articles using a vinyl chloride resin, and facilitates manufacture of formed articles having excellent properties.

What is claimed is:

1. An acrylic processing aid comprising:
   a core including an acrylic-silicone block copolymer formed by copolymerizing methyl methacrylate and a silicone-azo macroinitiator represented by the following Chemical Formula 1; and
   a shell formed by copolymerizing methyl methacrylate and a C12 to C18 alkyl methacrylate monomer:

[Chemical Formula 1]

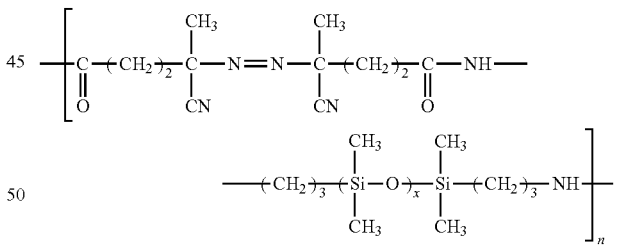

wherein, in Chemical Formula 1, x is from 50 to 100 and n is from 1 to 10.

2. The acrylic processing aid of claim 1, wherein the silicone-azo macroinitiator has a weight average molecular weight of 4,000 g/mol to 80,000 g/mol.

3. The acrylic processing aid of claim 1, wherein the core comprises the methyl methacrylate in 50% by weight to 90% by weight and the silicone-azo macroinitiator in 0.01% by weight to 20% by weight with respect to a sum of 100% by weight of the core monomers in the copolymerization.

4. The acrylic processing aid of claim 1, wherein the core further comprises a C2 to C18 alkyl acrylate monomer in 0% by weight to 30% by weight with respect to a sum of 100% by weight of the core monomers in the copolymerization.

5. The acrylic processing aid of claim 4, wherein the C2 to C18 alkyl acrylate monomer is one or more types selected from the group consisting of ethyl acrylate, propyl acrylate, butyl acrylate, and 2-ethylhexyl acrylate and stearyl acrylate.

6. The acrylic processing aid of claim 1, wherein, in the shell, 50% by weight to 80% by weight of the methyl methacrylate and 20% by weight to 50% by weight of the C12 to C18 alkyl methacrylate monomer are copolymerized with respect to a sum of 100% by weight of the shell monomers.

7. The acrylic processing aid of claim 1, wherein the C12 to C18 alkyl methacrylate monomer is one or more types selected from the group consisting of lauryl methacrylate, cetyl methacrylate, stearyl methacrylate, isostearyl methacrylate and tridecyl methacrylate.

8. The acrylic processing aid of claim 1, wherein the shell further comprises an aromatic vinyl monomer in 0% by weight to 30% by weight with respect to a sum of 100% by weight of the shell monomers in the copolymerization.

9. The acrylic processing aid of claim 8, wherein the aromatic vinyl monomer is one or more types selected from the group consisting of styrene, α-methylstyrene, o-ethylstyrene, p-ethylstyrene and vinyl toluene.

10. The acrylic processing aid of claim 1, wherein the acrylic-silicone block copolymer has specific viscosity of 0.3 to 2.0, wherein the specific viscosity is measured by dissolving 0.5 g of the core in 10 ml of tetrahydrofuran (THF) solvent and by calculating based on the following Mathematical Formula 1:

[Mathematical Formula 1]

$$\text{Specific viscosity} = (\text{time solution} - \text{time THF})/\text{time THF}.$$

11. The acrylic processing aid of claim 1, which has specific viscosity of 0.3 to 2.0, wherein the specific viscosity is measured by dissolving 0.5 g of the acrylic processing aid in 10 ml of a tetrahydrofuran (THF) solvent and by calculating based on the following Mathematical Formula 1:

[Mathematical Formula 1]

$$\text{Specific viscosity} = (\text{time solution} - \text{time THF})/\text{time THF}.$$

12. The acrylic processing aid of claim 1 comprising:
the core in 50% by weight to 80% by weight; and
the shell in 20% by weight to 50% by weight.

13. A vinyl chloride resin composition comprising the acrylic processing aid of claim 1.

* * * * *